United States Patent [19]

Gordon

[11] Patent Number: 4,460,988
[45] Date of Patent: Jul. 17, 1984

[54] DATA ACCESSING SYSTEM FOR OPTICAL DISK MASS MEMORY

[75] Inventor: Eugene I. Gordon, Convent, N.J.
[73] Assignee: AT&T Bell Laboratories, Murray Hill, N.J.
[21] Appl. No.: 199,022
[22] Filed: Oct. 20, 1980
[51] Int. Cl.³ .................. G11B 7/12; G11B 25/04
[52] U.S. Cl. ................................ 369/32; 369/33; 369/41; 365/127; 365/234
[58] Field of Search .................. 369/32–33, 369/44, 93, 95, 98, 109–112; 365/126, 127, 215, 234; 250/227, 568–570; 350/96.24, 96.25

[56] References Cited

U.S. PATENT DOCUMENTS

| | | | |
|---|---|---|---|
| 3,123,706 | 3/1964 | French | 365/127 |
| 3,131,291 | 4/1964 | French | 365/127 |
| 3,432,675 | 3/1969 | Roby | 365/126 |
| 3,526,880 | 9/1970 | Filipazzi | 365/127 |
| 3,573,471 | 4/1971 | Rolb | 365/127 |
| 3,885,110 | 5/1975 | DiMatteo | 369/112 |
| 4,094,010 | 6/1978 | Pepperl et al. | 364/44 |
| 4,212,516 | 7/1980 | Sawamura | 350/96.24 |

OTHER PUBLICATIONS

Bulthuis et al., Ten Billion Bits on a Disk, IEEE Spectrum, 8/79, pp. 26–33.
Bartolini et al., Optical Disk Systems Emerge, IEEE Spectrum, 8/78, pp. 20–28.
Callahan, Electro-Optical Data Storage Mechanism, IBM Tech. Disc. Bulletin, vol. 19, No. 8, 1/77, pp. 2992–2994.

Primary Examiner—Raymond F. Cardillo, Jr.
Attorney, Agent, or Firm—Michael J. Urbano

[57] ABSTRACT

The invention is a matrixing system, involving optical fibers, for accessing data encoded on an optical disk. Illustratively, a plurality of first fiber bundles couples optical sources to disk locations along angular coordinates, and a plurality of second fiber bundles couples disk locations along radial coordinates to optical detectors. Selective activation of a particular source and particular detector enables a predetermined disk location to be read. The system is characterized by a random access time on the order of 100 µs or less.

2 Claims, 2 Drawing Figures

DATA ACCESSING SYSTEM FOR OPTICAL DISK MASS MEMORY

TECHNICAL FIELD

This invention pertains to the field of optical disk mass memory systems and more particularly to an apparatus for rapidly accessing data encoded on a optical disk.

BACKGROUND OF THE INVENTION

Conventional magnetic disk recording systems use a computer controlled magnetic head to record data onto a magnetic disk and to read data from the magnetic disk. Typically, the magnetic disk includes numerous pre-grooved circular tracks which in turn are divided into segments. Each segment of a track contains space for an encoded address heading as well as encoded data. Data is read or recorded by rotating the magnetic disk under the magnetic head.

There are two types of magnetic disk recording systems, "fixed head" having one head for each track and "moving head" to be described in greater detail below. The fixed head systems require large spacing between tracks thereby reducing storage density. The moving head system is a recent innovation to increase storage density.

Unfortunately, the moving head type of memory system has a relatively long random access time. The random access time is the average time it takes the magnetic head to locate a selected address heading on the disk. For a typical moving head magnetic disk, the random access time is the sum of two components: the time to move the magnetic head to the appropriate track, and the time it takes for the desired segment of the track to be rotated to the position of the head. (It should be noted that a fixed head system avoids the first of these two delays.) For a typical disk, the typical time to accomplish the track change is about 3 msec. Depending on the desired address, for a typical disk rotating at 3600 RPM, it may take up to 16.6 msec. (period of rotation of the disk) for the desired address heading of the selected segment of the track to reach the magnetic head. The average time to reach the desired address heading is therefore approximately 8 msec., and the total average random access time averages about 11 msec. This random access time is sufficiently long that the overall strategy of operation usually involves using the resulting access wait period to do other tasks, thus imposing additional requirements on the overall system protocol. If the random access time could be reduced to a time interval of approximately 200 μsec. or less, it would become feasible to merely wait during access, and thus to simplify overall operation.

Instead of a magnetic disk, an optical disk may be used to store encoded data. Typically, the encoding of data on an optical disk modulates either the optical transmission properties of the disk or the optical reflection properties of the disk.

The conventional system for accessing data encoded on an optical disk is analogous to the above-described system for accessing data on a magnetic disk. A computer controlled optical head, generally comprising a laser and associated optics, is used to locate and read data encoded on a selected segment of a selected track of the optical disk. Random access times for the optical system are similar to those of the magnetic system.

A data retrieval system that uses the previously described conventional technology and at the same time has a sufficiently short random access time to avoid the need for doing other tasks during the data access time could take the form of a separate multiplicity of independent magnetic or optical heads for each track. For example, to achieve a random access time of 100 μsec. for a disc rotating at 3600 RPM, 80 heads per track would be required. This insures that no encoded address heading is more than approximately 200 μsec. from a head capable of reading the encoded address heading. For such a rotating disk having 1000 tracks, 80,000 heads would be needed, a number clearly impractical for current magnetic disk or optical disk memory systems.

Accordingly, efforts have been directed at developing a data accessing system for a disk memory system characterized by a short average random access time on the order of 100 μsec. or less.

SUMMARY OF THE INVENTION

The present invention is an apparatus having a short random access time for accessing and reading data encoded on an optical disk. In order to have an average random access time on the order of 100 μsec. or less, it is advantageous for any given address heading on a rotating optical disk to be within 100 μsec. or less of a "head" or other suitable means capable of reading the encoded address heading and associated data. In the present invention, a matrixing system replaces the previously mentioned multiplicity of independent heads for each track as a means for obtaining the desired random access time.

The inventive matrixing apparatus for accessing data encoded on an optical disk, which rotates about an axis perpendicular to the plane of the disk, includes: a plurality of first means for optically communicating with an array of fixed locations in the plane of the disk; and a plurality of second means for optically communicating with the array of fixed locations in the plane of the disk. The array of fixed locations is divisible into separate first groups of locations and separate second groups of locations. Each one of the fixed locations in the array is common to one of the first groups of locations and one of the second groups of locations. Each one of the previously mentioned first means is capable of optical communication with one of the first groups of locations, and each one of the previously mentioned second means is capable of optical communication with one of the second groups of locations.

In one particular illustrative embodiment of the invention, the plurality of first means comprises a plurality of first optical fiber bundles, the fibers of each one of the first bundles being aligned so as to be capable of optical communication with one of the first groups of locations; and the plurality of second means comprises a plurality of second optical fiber bundles, the fibers of each one of the second bundles being aligned so as to be capable of optical communication with one of the second groups of locations.

Advantageously, the illustrative embodiment of the invention also includes an array of optical radiation emitting devices and an array of optical radiation detectors. Each one of the radiation emitting devices is capable of coupling radiation into one of the first fiber bundles, thereby illuminating one of the first groups of locations, and each one of the detectors is optically coupled to one of the second fiber bundles so as to be capable of detecting radiation emanating from one of said second groups of locations. Electronic activation of a selected one of the radiation emitting devices and a selected one of the detectors is sufficient to access data encoded on the rotating optical disk coincident with one selected location in the array of fixed locations in the plane of the disk.

Illustratively, all of the locations within each one of the first groups of locations have substantially the same angular coordinate, and all of the locations within each one of the second groups of locations have substantially the same radial coordinate. The coordinates are measured from an origin coincident with the intersection of the axis of rotation of the disk and the plane of the disk.

For certain types of optical disks, the data encoded on the disk alters the optical transmission properties of the disk. In this case, it is advantageous for the plurality of first fiber bundles to be proximate to one major surface of the disk and the plurality of second fiber bundles to be proximate to the second opposed major surface of the disk. At any given time, data is read as the disk rotates between a pair of corresponding fibers. One member of the pair belongs to a selected first fiber bundle that is coupled to an activated radiation emitting device, such as a semiconductor light emitting diode or laser, and the other member of the pair belongs to a selected second fiber bundle that is coupled to an activated photodetector. The encoded data on the disk modulates the transmission of optical radiation between the fibers of the above-mentioned fiber pair.

The inventive accessing system has a number of important advantages. The random access time is no longer determined by the time taken to move a magnetic or optical head to a selected track plus the time taken for a selected segment of the track to rotate to the position of the head. Instead, the random access time is largely determined electronically rather than mechanically. For example, a computer may access the data encoded on the rotating disk coincident with a location in the array of fixed locations by electronically activating one of the previously mentioned radiation emitting devices and one of the previously mentioned optical radiation detectors. If upon reading an address heading coincident with that particular location, the computer finds it has accessed the wrong location, it merely activates another radiation emitting device and/or detector until the correct address heading is found. Thus, the disk is searched electronically rather than mechanically for the desired data thereby resulting in a short random access time. Movement of the head from track to track is eliminated and the only motion is rotation of the disk for reading of encoded data.

In addition, the invention has the further advantage in that activation of more than one pair of corresponding fibers will allow for the simultaneous reading of data from a plurality of tracks.

BRIEF DESCRIPTION OF THE DRAWINGS

For purposes of clarity, the figures have not been drawn to scale.

DETAILED DESCRIPTION

Figure 1:
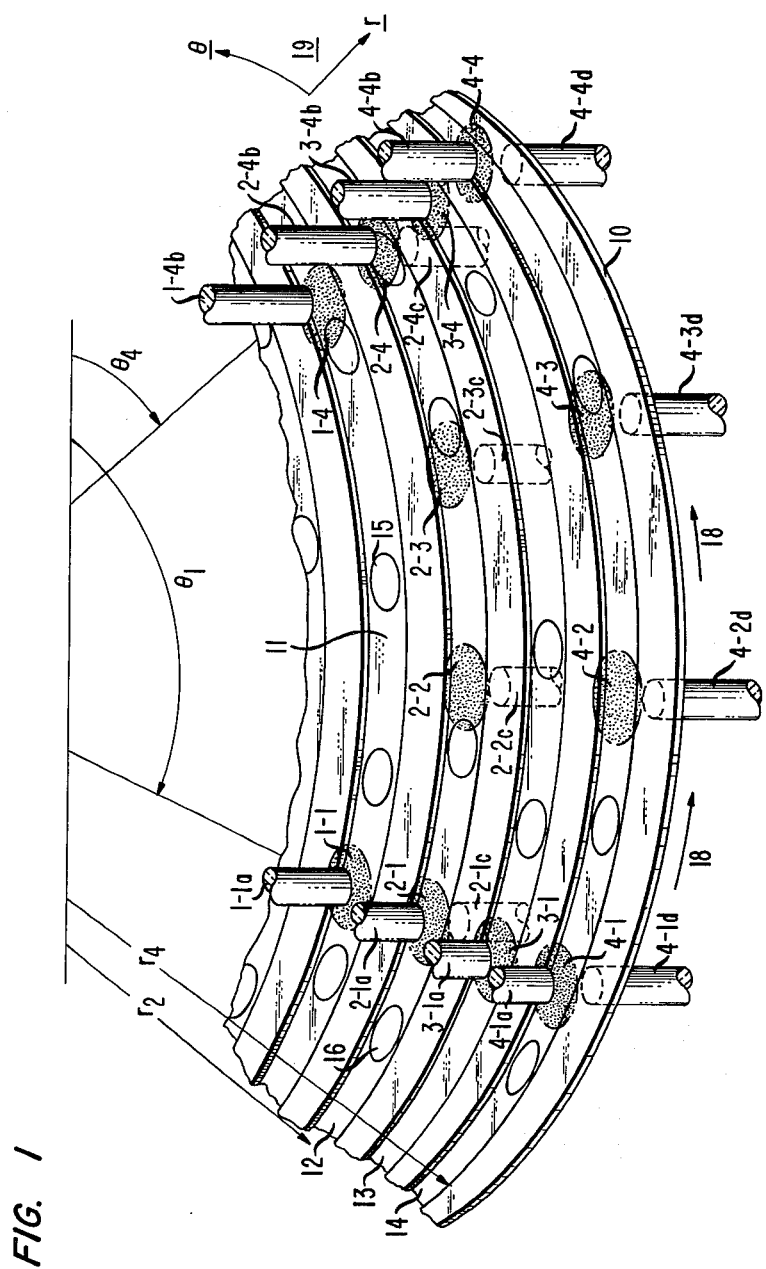
FIG. 1 schematically illustrates an enlarged view of a portion of an optical disk and optical fiber groups for use in an optical fiber matrixing apparatus for accessing data encoded on the disk, in accordance with an illustrative embodiment of the invention.

A portion 10 of an optical disk, which rotates counterclockwise in the direction of arrow 18, is shown in FIG. 1. A typical optical disk has numerous concentric circular tracks for encoding data, four of which 11, 12, 13, and 14 are shown for purposes of illustration, separated by spacer regions. Data can be recorded by altering the optical transmission properties of the disk along the tracks. Illustratively, this alteration is done by using a laser to form small holes (e.g., 15 and 16) along the tracks to indicate a logic one or a logic zero.

Locations 1-1 through 4-4 are part of an array of fixed locations in plane 19 which is the plane of the disk. Locations in the plane of the disk are identified by the coordinates r and $\theta$. The array is divisible into separate first groups of locations and separate second groups of locations. Locations 1-1, 2-1, 3-1 and 4-1 form part of one of the first groups of locations. Locations 1-4, 2-4, 3-4 and 4-4 form part of another one of the first groups of locations. For the illustrative embodiment of the invention shown in FIG. 1, all of the locations in a particular one of the first groups of locations have substantially the same angular coordinate $\theta$. Thus locations 1-1, 2-1, 3-1 and 4-1 have the same angular coordinate $\theta_1$ and locations 1-4, 2-4, 3-4 and 4-4 have the same angular coordinate $\theta_4$.

In contrast, locations 2-1, 2-2, 2-3 and 2-4 form part of one of the second groups of locations. Locations 4-1, 4-2, 4-3 and 4-4 form part of another one of the second groups of locations. For the illustrative embodiment of the invention shown in FIG. 1, all of the locations in each one of the second groups of locations have substantially the same radial coordinate r which substantially coincides with a track on the disk. Thus locations 2-1, 2-2, 2-3 and 2-4 have the radial coordinate $r_2$ which is substantially coincident with track 12 and locations 4-1, 4-2, 4-3 and 4-4 have the radial coordinate $r_4$ which is substantially coincident with track 14.

Each location in the array is common to one of the first groups of locations and one of the second groups of locations. For example, location 4-4 is common to the first group of locations which includes locations 1-4, 2-4, 3-4 and 4-4 and to the second group of locations which includes locations 4-1, 4-2, 4-3 and 4-4.

In accordance with an illustrative embodiment of the invention, a plurality of first means for optically communicating with the array of fixed locations in plane 19 comprises a plurality of first fiber bundles. The fibers of each one of the first fiber bundles are aligned so as to be capable of optical communication with one of the first groups of locations. Fibers 1-1a, 2-1a, 3-1a and 4-1a belong to fiber bundle a of the plurality of first fiber bundles. Fibers 1-4b, 2-4b, 3-4b and 4-4b belong to fiber bundle b of the plurality of first fiber bundles.

A plurality of second means for optically communicating with the array of fixed locations in plane 19 comprises a plurality of second fiber bundles. The fibers of each one of the second fiber bundles are aligned so as to be capable of optical communication with one of the second groups of locations. Fibers 2-1c, 2-2c, 2-3c and 2-4c belong to fiber bundle c of the plurality of second fiber bundles. Fibers 4-1d, 4-2d, 4-3d and 4-4d belong to fiber bundle d of the plurality of second fiber bundles. Advantageously, each one of the first fiber bundles is coupled to an optical radiation emitting device in an array of such devices (see FIG. 2) and each one of the second fiber bundles is coupled to an optical radiation detector in a detector array (see FIG. 2). In an alternative arrangement, each one of the first fiber bundles is coupled to a radiation detector and each of the second fiber bundles is coupled to a radiation emitting device.

The following examples illustrate the use of the optical fiber matrixing system for accessing data encoded on an optical disk. In order to read data encoded on the rotating disk coincident with fixed location 4-4, the optical radiation emitting device coupled to fiber bundle b can be activated, thereby illuminating locations 1-4, 2-4, 3-4 and 4-4 and the optical radiation detector coupled to bundle d can also be activated. Thus, as the optical disk rotates, the encoded data coincident with location 4-4 modulates the transmission of radiation from fiber 4-4b to fiber 4-4d, thereby producing an electric signal at the output of the activated detector which carries the data read from the disk. As another example, data coincident with location 2-1 can be accessed by activating the radiation emitting device coupled to fiber bundle a and by activating the radiation detector coupled to fiber bundle c.

Figure 2:
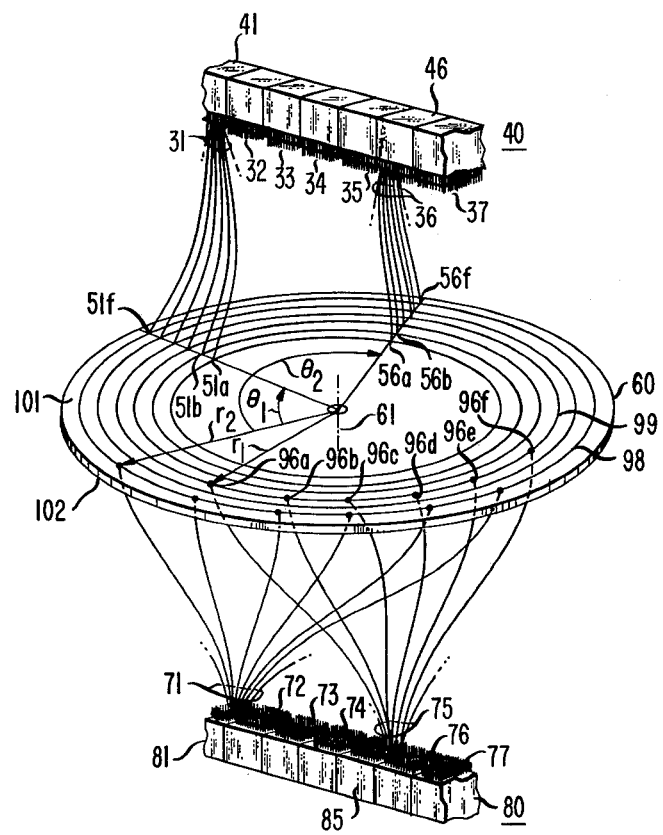
FIG. 2 also schematically illustrates the optical fiber matrixing system for accessing data encoded on an optical disk, in accordance with an illustrative embodiment of the invention.

A schematic overall view of one particular embodiment of the inventive data accessing apparatus is shown in FIG. 2. Optical disk 60 rotates about axis 61. Fiber bundles 31 through 37 form part of the plurality of first fiber bundles. Each one of fiber bundles 31-37 is coupled to a radiation emitting device, such as a semiconductor laser or light emitting diode, in an array 40 of such devices (see Biard, J. R., AFAL-TR-73-164 for an example of an optical fiber bundle coupled to a light emitting diode). In addition, the fibers of each one of the first fiber bundles are aligned so as to be capable of optical communication with one of the first groups of locations in the plane of disk 60. In the embodiment of FIG. 2, all locations in each one of the first groups have the same angular coordinate $\theta$. Illustratively, fiber bundle 31 is coupled to radiation emitting device 41. The fibers of fiber bundle 31 are aligned so as to be capable of optical communication with one of the first groups of fixed locations. Locations 51a through 51f form a part of this particular first group. Each of these locations has the angular coordinate $\theta_1$. Similarly, fiber bundle 36 is coupled to radiation emitting device 46. The fibers of fiber bundle 36 are capable of optical communication with another one of the first groups of locations. Locations 56a through 56f form part of this other first group of locations. Each one of locations 56a through 56f has angular coordinate $\theta_2$. The fibers of the plurality of first fiber bundles are maintained in alignment proximate to the plane of the disk by a fixture (not shown) adjacent to major surface 101 of the disk 60.

Fiber bundles 71 through 77 form part of the plurality of second fiber bundles. Each of the fiber bundles 71 through 77 is coupled to a semiconductor photodetector in semiconductor photodetector array 80. In addition, the fibers of each of the second fiber bundles are capable of optical communication with one of the second groups of locations in the plane of disk 60. In the embodiment of FIG. 2, all locations in each one of the second groups have the same radial coordinate r. Illustratively, fiber bundle 75 is coupled to photodetector 85. The fibers of fiber bundle 75 are capable of optical communication with one of the second groups of fixed locations in the plane of disk 60. Locations 96a through 96f form part of this particular second group of locations. Fixed locations 96a through 96f all have substantially the same radial coordinate $r_1$ which is substantially coincident with track 99. Each one of the other fibers (not shown) of fiber bundle 75 is also capable of optical communication with one of the fixed locations coincident with track 99. Similarly, fiber bundle 71 is coupled to photodetector 81. The fibers of fiber bundle 71 are aligned so as to be capable of optical communication with the fixed locations, coincident with track 98, having radial coordinate $r_2$. The fibers of the plurality of second fiber bundles are maintained in alignment proximate to the plane of disk 60 by a fixture (not shown) adjacent to major surface 102 of disk 60.

For the embodiment of the invention shown in FIGS. 1 and 2, the two pluralities of fiber bundles form the optical fiber matrixing system. Selection of one of the first fiber bundles by activation of a radiation emitting device selects an angular coordinate and selection of one of the second fiber bundles by activation of a detector selects a radial coordinate.

Advantageously, the desired random access time is about 100 $\mu$sec. Thus, in the case of a disk rotating at 3600 RPM, there should be about 80 first fiber bundles corresponding to about 80 different angular coordinates in the plane of the disk. This arrangement ensures that any given address heading on the disk can be rotated to a suitable pair of optical fibers within approximately 100 $\mu$sec. If fibers having a diameter of 100 $\mu$m or less are used, a 10 cm. section on the radius of the disk could have about 100 tracks. Using these parameters, emitter array 40 of FIG. 2 would require about 80 lasers or light emitting diodes and detector array 80 of FIG. 2 would require about 1000 detectors (one for each track) for a total of 1080 devices. This represents a substantial improvement over the previously mentioned 80,000 independent heads which would be required by the conventional technology.

Alternatively, each of the first fiber bundles could be coupled to a photodetector for a total of 80 detectors and each of the second fiber bundles could be coupled to a laser or light emitting diode for a total of 1000 radiation emitting devices. At least in the case where the emitting devices are lasers, the previous arrangement is expected to be preferable to the latter arrangement because the integration of detectors is easier than the integration of lasers using currently available technology.

Finally, it is to be understood that the above-described arrangements are only illustrative of the principles of the present invention. In accordance with those principles, numerous other structural configurations may be devised by those skilled in the art without departing from the spirit and scope of the invention.

I claim:

1. Apparatus for accessing data on the tracks of an optical disk, while it is rotating about an axis perpendicular to the plane of the disk, comprising
    a plurality of light sources,
    a plurality of first optical fibers arranged in a plurality of first bundles, each first bundle having one end of its fibers optically coupled to one of said light sources and the other ends of its fibers positioned adjacent one side of said disk, within each first bundle said other ends of said first fibers being arranged in a line so as to have the same angular coordinate but different radial coordinates, but different ones of said first bundles having said one ends of said first fibers optically coupled to different light sources and having said other ends of said first fibers positioned along lines at different angular coordinates, a plurality of light detectors, a plurality of second optical fibers arranged in a plurality of second bundles, each second bundle having one end of its fibers optically coupled to one of said light detectors and the other ends its fibers positioned adjacent the opposite side of said disk, within each second bundle said other ends of said second fibers being arranged along one of said tracks so as to have the same radial coordinate but different angular coordinates, but different ones of said second bundles having said one ends of said second fibers optically coupled to different light detectors and having said other ends of said second fibers positioned along tracks at different radial coordinates, and means for activating a preselected source so as to cause light to pass through one of said first bundles to points on said disk along a line a predetermined angle $\theta$, and means for activating a preselected detector which is optically coupled through one of said second bundles to points along one of said tracks at a predetermined radius r, thereby to read data on said disk at the location given by the polar coordinates (r, $\theta$).

2. Apparatus for accessing data on the tracks of an optical disk, while it is rotating about an axis perpendicular to the plane of the disk, comprising a plurality of light sources, a plurality of first optical fibers arranged in a plurality of first bundles, each first bundle having one end of its fibers optically coupled to one of said light sources and the other ends of its fibers positioned adjacent one side of said disk, within each first bundle said other ends of said first fibers being arranged along a track so as to have the same radial coordinate but different angular coordinates, but different ones of said first bundles having said one ends of said first fibers optically coupled to different light sources and having said other ends of said first fibers positioned along tracks at different radial coordinates, a plurality of light detectors, a plurality of second optical fibers arranged in a plurality of second bundles, each second bundle having one end of its fibers optically coupled to one of said light detectors and the other ends its fibers positioned adjacent the opposite side of said disk, within each second bundle said other ends of said second fibers being arranged in a line so as to have the same angular coordinate but different radial coordinates, but different ones of said second bundles having said one ends of said second fibers optically coupled to different light detectors and having said other ends of said second fibers positioned along lines at different angular coordinates, and means for activating a preselected source so as to cause light to pass through one of said first bundles to points on said disk along one of said tracks at a predetermined radius r, and means for activating a preselected detector which is optically coupled through one of said second bundles to points along a line at a predetermined angle $\theta$, thereby to read data on said disk at the location by given polar coordinates (r, $\theta$).

* * * * *